United States Patent
Macchetti et al.

(10) Patent No.: US 10,027,482 B2
(45) Date of Patent: Jul. 17, 2018

(54) METHOD AND UNIQUE CRYPTOGRAPHIC DEVICE WITH A PHYSICALLY UNCLONABLE FUNCTION

(71) Applicant: NAGRAVISION S.A., Cheseaux-sur-Lausanne (CH)

(72) Inventors: Marco Macchetti, Casnate con Bernate (IT); Claudio Favi, Ollon (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 211 days.

(21) Appl. No.: 14/306,512

(22) Filed: Jun. 17, 2014

(65) Prior Publication Data

US 2014/0376717 A1 Dec. 25, 2014

(30) Foreign Application Priority Data

Jun. 18, 2013 (EP) ................................. 13172569
Oct. 3, 2013 (EP) ................................. 13187257

(51) Int. Cl.
*H04L 9/14* (2006.01)
*H04L 9/08* (2006.01)
*G09C 1/00* (2006.01)

(52) U.S. Cl.
CPC .................. *H04L 9/14* (2013.01); *G09C 1/00* (2013.01); *H04L 9/0866* (2013.01)

(58) Field of Classification Search
CPC ....................................................... H04L 9/14
See application file for complete search history.

(56) References Cited

U.S. PATENT DOCUMENTS

| | | | |
|---|---|---|---|
| 6,105,133 A * | 8/2000 | Fielder | H04L 9/0891 380/283 |
| 8,379,856 B2 * | 2/2013 | Potkonjak | H04L 9/0866 380/255 |
| 8,516,269 B1 * | 8/2013 | Hamlet | G06F 21/00 713/189 |
| 9,225,512 B1 * | 12/2015 | Trimberger | H04L 9/0866 |

(Continued)

FOREIGN PATENT DOCUMENTS

| | | |
|---|---|---|
| EP | 2 081 170 | 7/2009 |
| WO | WO 2014/113255 | 7/2014 |

OTHER PUBLICATIONS

European Search Report issued in EP 14171232 dated Sep. 29, 2014.

(Continued)

*Primary Examiner* — William Powers
*Assistant Examiner* — Thanh Le
(74) *Attorney, Agent, or Firm* — DLA Piper LLP (US)

(57) ABSTRACT

A method and a cryptographic device for encrypting/decrypting an input message by using an algorithm having as entries, said input message, a cryptographic key, and a complementary unique value used as parameter of the algorithm. The output data is formed by the input message decrypted/encrypted by the algorithm using the cryptographic key and the complementary value. The latter is determined on the basis of a unique value physically bound to an electronic device by using a physically unclonable function (PUF) which is inherent to this device and which is used to generate this unique value from a plurality of physical measurements carried out on components integrated in said device.

16 Claims, 4 Drawing Sheets

(56) References Cited

U.S. PATENT DOCUMENTS

| 2010/0031065 A1* | 2/2010 | Futa | H03K 3/0315 |
| | | | 713/194 |
| 2012/0066515 A1* | 3/2012 | Kasuya | H04L 9/0866 |
| | | | 713/189 |
| 2014/0201851 A1 | 7/2014 | Guo et al. | |

OTHER PUBLICATIONS

Michael S. Kirkpatrick et al., "PUR ROKs: A Hardware Approach to Read-Once Keys", ASAICCS'11, pp. 155-164; Mar. 22-24, 2011.

Shohreh Sharif et al., "Ring Oscillator Physical Unclonable Function with Multi Level Supply Voltages", ARXIV.org, Jul. 17, 2012 (8 pages).

Roel Maes et al., "Physically Unclonable Functions: A Study on the State of the Art and Future Research Directions", Towards Hardware-Intrinsic Security: Foundations and Practice, Springer, pp. 3-37, Nov. 4, 2010.

* cited by examiner

METHOD AND UNIQUE CRYPTOGRAPHIC DEVICE WITH A PHYSICALLY UNCLONABLE FUNCTION

CROSS-REFERENCE TO RELATED APPLICATIONS

This application claims the benefit of European Application No. 13172569.9 filed Jun. 18, 2013 and European Application No. 13187257.4 filed Oct. 3, 2013. All of the foregoing applications are incorporated by reference in their entireties.

TECHNICAL DOMAIN

This invention refers to a cryptographic process or method allowing encrypting and/or decrypting messages introduced as input data in a cryptographic algorithm. These messages are introduced together with a key used as a main parameter for a cryptographic operation managed by the algorithm. More particularly, the invention refers to the use of physically unclonable functions in such a process, i.e. the use of functions that cannot be reproduced, copied, nor cloned. The invention also concerns a cryptographic device for the implementation of such a process.

PRIOR ART

The physically unclonable functions (or PUF for short) are being studied in the academic and the industrial world as unique identifier sources, physically connected to electronic components which are incorporated in, or associated to, integrated circuits. The main idea aims to exploit the variations of the manufacturing process of these components that render electronic devices (such as chips) unique thanks to their intrinsic properties.

This technology is based on the particularities that all manufacturing processes of electronic components ordinarily possess. Since such processes are imperfect, they create, through no fault of their own, minor differences among the components they manufacture. In other words, although these components are produced from the same production line and in the same conditions, there are however differences which, in an intrinsic way, involuntarily personalize these components. The trick is to transform these differences, resulting from the manufacturing process hazards, into useful information having the distinctive feature of not being predictable or reproducible by the manufacturing process, and thus being able to identify a component or a set of electronic components among others.

A physically unclonable function, hereinafter called PUF function, is a function that takes advantage of the random variations in the components of an integrated circuit, by determining, with exact measurements, one or more physical quantities of these electronic components. It is thus easy to create such a PUF function, but it is very difficult or even impossible, to clone it, for example by creating a function that would constitute a particular predefined identifier, mainly because the value derived from such a function is impossible to predict and/or to reproduce. The information derived from these imperceptible differences can be represented by a pseudo-random bit sequence. This information thus has all the expected characteristics of a secret that can be advantageously used for cryptographic purposes.

Most applications considered up to now can be grouped together in three main categories, namely the generation of chips identifiable by means of a unique identifier defined by such a PUF function, the chip authentication by a process involving associated challenges and responses, as well as the generation of cryptographic keys.

Presently, it is noted that the majority of the applications refer to the latter category and aim to cover solutions where the value of the PUF function is used as a cryptographic key in secured message exchanges. In such an approach, a first problem resides in the fact that the user cannot choose the value of the PUF function, as it is determined for each chip by the intrinsic characteristics of the latter. Accordingly, the key of the algorithm becomes a predefined element, immutable for the user. Another problem resides in the fact that it is inconvenient, or even complicated, to implement a change of keys in an existing system, particularly in a system involving a prioritization of keys which has already been set and started.

Moreover, the value of the PUF function is a value that can be defined as immutable only in ideal theoretic conditions corresponding to an absence of parasitic noise. However, in real situations, this value slightly fluctuates according to the conditions of use. These fluctuations can typically refer to operating temperature variations of the electronic components or slight variations in the tension of their supply. They can also be caused by a random noise produced by the circuit itself (for example in the case of an aged circuit) or by the environment. Such instabilities generate erroneous responses, i.e. responses that, in certain conditions of use, do not correspond anymore to those obtained in a controlled environment, such as that of a production line.

Certain manufacturers propose solutions where the final user according to the setup messages can select key values. However, as this final user can modify such setup messages, he is thus able to easily generate wrong keys, which constitutes another problem of the approaches presently known.

BRIEF DESCRIPTION OF THE INVENTION

This invention aims to solve, at least in part, the above-mentioned problems and proposes the use of a PUF function in order to make the execution of the cryptographic algorithms unique, by personalizing them so that they are specific to each chip or electronic device produced.

In order to do this, the invention suggests a cryptographic process for encrypting/decrypting an input message by means of an algorithm admitting as input data, said input message, a cryptographic key, and a distinct complementary value of the key used as the algorithm parameter. This process produces, as output data, the input message decrypted/encrypted by the algorithm using the cryptographic key and the complementary value.

The complementary value corresponds, as such, to one of the entries of the cryptographic algorithm, and in English is better known by the cryptographic community as <<tweak>>. It allows refining the algorithm by slightly modifying the latter and by obtaining, accordingly, a slightly different response as an output data. The introduction of a modified key on the other hand induces significant changes in the value obtained at the output of the algorithm.

According to the invention, this complementary value is determined on the basis of a unique value which is physically bound to an electronic device by a physically unclonable function (PUF) that is inherent to this device. This PUF function is used for generating this unique value from a plurality of physical measurements carried out on components integrated in the electronic device. Advantageously, the cryptographic process of the present invention allows, without imposing a cryptographic key or influencing its choice, to realize cryptographic operations by means of an algorithm personalized by a function which is physically in relation to a hardware support, typically, to an integrated circuit by which the PUF function is generated.

In a preferred embodiment, the PUF function is parameterized by a target datum, which, during an initial setup operation, allows to further personalizing the electronic device hosting the PUF function, by selecting the components that are the basis of this function. In other words, this target datum allows to choose, among the totality of the available electronic components on an integrated circuit, a subset of electronic components on which the measurements of one or several physical quantities will be carried out. As an alternative, this target datum could allow to select, in accordance with these components and in particular based on their identifier, a subset of measurements carried out on all or part of the electronic components. Preferably, this target datum further allows determining how the selected electronic components must be combined in order to generate the unique value of the PUF function.

Advantageously, a judicious selection offered by this choice allows to liberate as much as possible from the fluctuations due to the variable conditions of use, and thus to stabilize the response given by the PUF function. Thus the legitimate administrator of the electronic device, i.e. the manager who controls the creation of the electronic device and more generally the chip or the electronic card of the cryptographic module, will have the liberty to choose (even dynamically) the value of the PUF function which will be used as a parameter in the cryptographic algorithm. This control can be obtained thanks to the introduction of a target message (target datum), which will be taken into account each time the unique value deriving from the PUF function has to be generated.

Other advantages and embodiments will be also presented in the following detailed description.

BRIEF DESCRIPTION OF THE DRAWINGS

The invention will be better understood thanks to the annexed schematic drawings, given by way of example and not as a limitation, in which.

DISCLOSURE OF THE INVENTION

Figure 1:
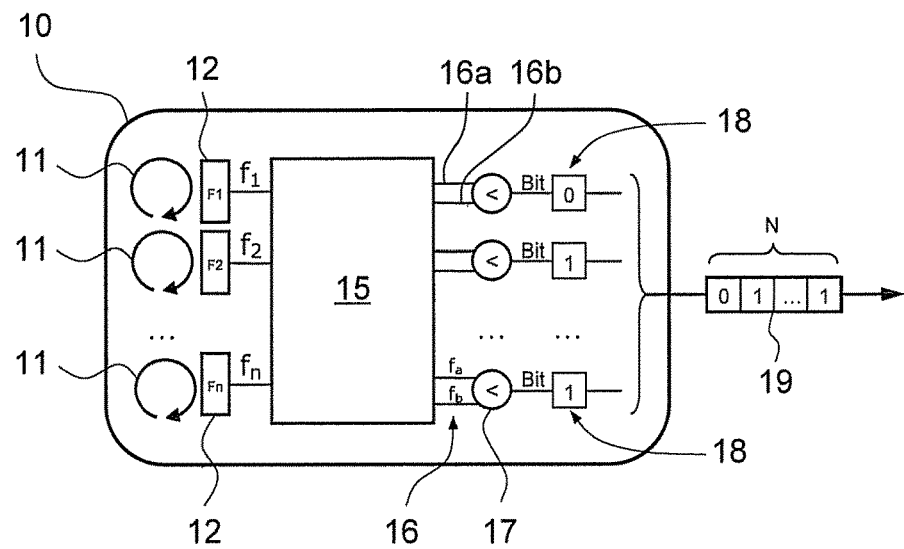
FIG. 1 is a schematic representation of an electronic device, typically an integrated circuit, which exploits a physically unclonable function (PUF).

FIG. 1 represents an electronic device 10, which can be typically an integrated circuit, an electronic chip, or a part of a chip. This device 10 includes several electronic elements, among which is present a plurality of components 11 used as source elements for supplying useful measurements for the creation of a physically unclonable function, so-called PUF function. As schematically represented in this figure, these components 11 refer for example to different oscillators, which number is typically close to several dozens. These oscillators 11 are each coupled to a measuring device 12 intended to determine a physical value specific to each oscillator. In the present case, the measuring elements 12 are able to accurately measure frequencies f of the oscillators to which they are dedicated. Although in the following, we will essentially refer to oscillators as examples for components 11, it is clear that this embodiment is by no means restrictive and that other components 11 could be used, from which other physical quantities could be measured, such as current, tension, power, resistance, temperature, time, light intensity, etc . . .

In a first approach it can be said that the oscillators that compose the electronic device 10 are identical and do not differ from a device 10 to the other, in particular if they are obtained from the same production line. However, in a second approach, it can be seen that each oscillator has its own frequency and that frequencies from all oscillators are not exactly identical, but they slightly fluctuate from one to the other. In the deep submicron technologies, the low variation of the frequency, within oscillators of the same type produced by the same manufacturing process on one or more identical production chains, is sufficient for creating a physically unclonable function. This PUF function will thus take advantage of the fact that each oscillator has an intrinsic frequency that essentially results from the low variations to which it was submitted during manufacture.

The values $f_1, f_2, \ldots f_n$ measured by elements 12 of FIG. 1 are transmitted to a central unit 15 which, according to preset parameters, is able to group them by pairs and to direct each of these pairs towards two particular outputs 16 of the central unit. In order to do this, these outputs 16 are also grouped by pairs of outputs 16a, 16b, each of these pairs finally leading a pair of measured values $(f_a, f_b)$ to a comparator 17, herein illustrated outside the central unit 15.

Each comparator 17 has the purpose to determine which of the outputs 16a, 16b, among those associated to it, conveys the highest or lowest measurement. In response, the comparator 17 will produce, at its output, an elementary binary value 18 that will typically be a bit 1 or 0. This elementary binary value can be equivalent to the bit 0, if for example, the measured value that is conveyed by the output 16a is lower than the one conveyed via the output 16b. Conversely, if the value arising from the output 16a is higher than that of the output 16b, the comparator 17 will produce an elementary binary value 18 corresponding to the bit 1.

The sequence of all the elementary binary values produced by the ordered succession of comparators 17 will constitute a unique value 19, which can be also called PUF value with reference to the function of the same name that produces this value. This value is unique since it is specific to the electronic device 10. Moreover, it is physically bound to this device 10, since it ensues from measurements of one or several physical quantities of the components of this device. As this unique value is made of all the elementary binary values 18 and that the latter are representative of the physical properties of the oscillators 11, said unique value 19 arising from the electronic device 10 is a value that can be compared to a kind of fingerprint or to a signature which is specific to the electronic device 10.

Figure 2:
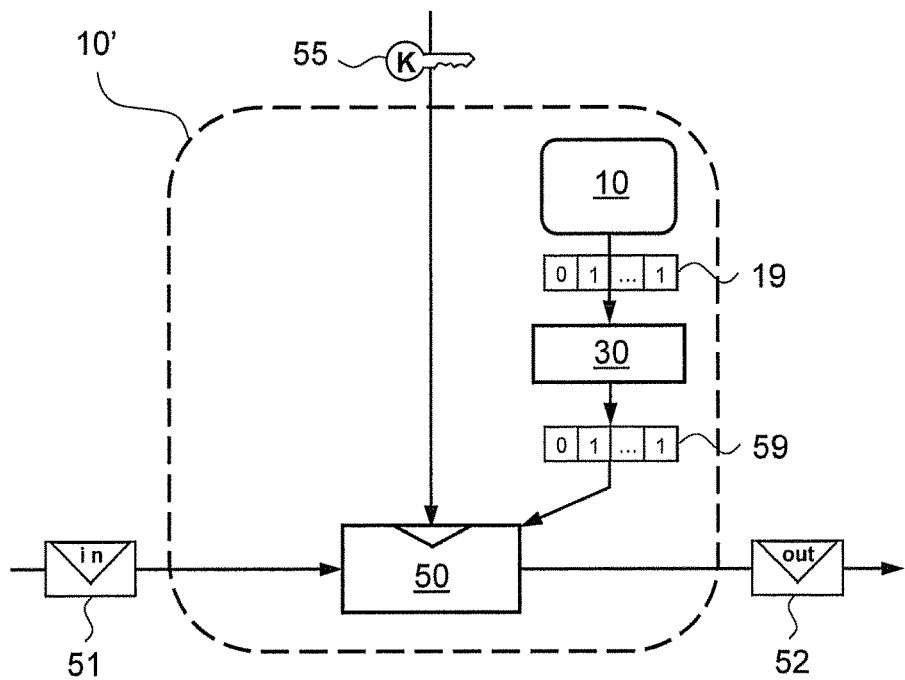
FIG. 2 is an illustration of a first embodiment of the process that is the object of this invention.

FIG. 2 gives a schematic illustration of a first embodiment of the process of this invention. This figure shows the electronic device 10 that can be one of the parts of a set of elements constituting, for example, a cryptographic module 10'. For this purpose, this module also contains means for implementing a cryptographic algorithm 50, for receiving an input message 51 to be encrypted or decrypted, for receiving a cryptographic key 55 useful for the algorithm 50 and for emitting, in response, an output message 52 corresponding to the transformation (encryption/decryption) of the input message 51 by using the algorithm 50.

According to the invention and as shown in this figure, the algorithm 50 is not simply set by the key 55 but also admits as an entry data a complementary value 59 which is used as a second parameter of the algorithm 50. Advantageously, the key 55 is not affected by this complementary value, and only the basic algorithm 50, which could be in common with a large number of cryptographic modules 10', will be modified by the complementary value by personalizing it. This complementary value 59 is determined on the base of the unique value 19, i.e. it is calculated in function of a value that is not only unique but also physically connected to the electronic device 10. The physical dependence between this value and the electronic device 10 results from the PUF function implemented by this device 10 in order to generate this unique value 19 from a plurality of physical measurements $f_1, f_2, \ldots f_n$ carried out on components 11 of this device.

Advantageously, when it is exploited in its capacity as a cryptographic algorithm, this physical binding allows to obtaining a response 52, which is a function of the association between the electronic device 10 and the hardware that hosts the algorithm 50. Thus, if the algorithm 50 is implemented on a first hardware support and that the unique value 19 results from a second hardware support, then only the union of these two hardware supports will allow for example to correctly decrypt an input message 51 by means of an algorithm 50 set not only by a key 55 but also by a complementary value 59 determined on the base of the unique value arising from the second hardware support. In such a configuration, the electronic device 10 will be typically removable from the cryptographic module 10' or from the rest of this module, in particular the electronic device 10 could be an independent removable device, capable of being associated with the cryptographic module 10'.

As shown in FIG. 2, the complementary value 59 is delivered to the algorithm 50 by an intermediate module 30, which in a simplified embodiment only attributes the unique value 19 to the complementary value 59, so that the latter simply corresponds to the unique value 19 derived from the electronic device 10.

Figure 3:
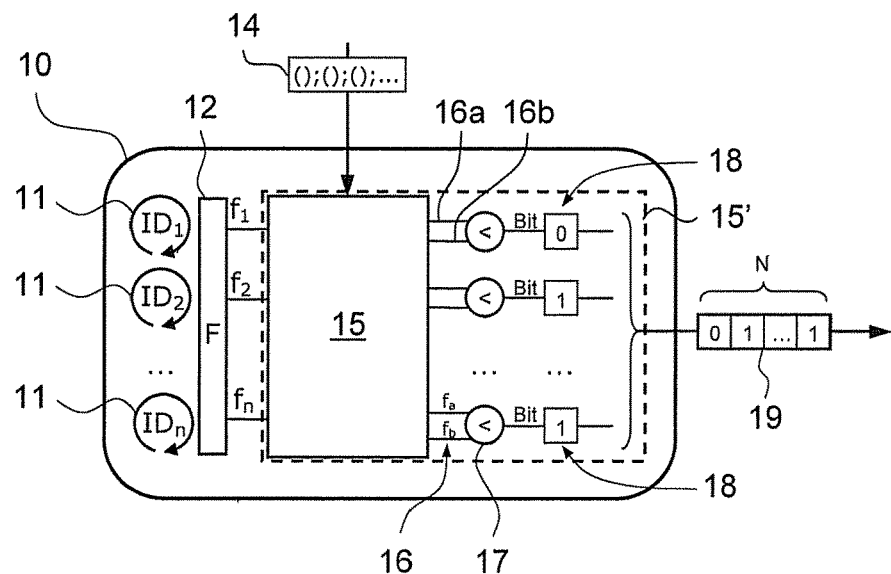
FIG. 3 is a schematic representation of the electronic device of FIG. 1 according to an improved second embodiment.

FIG. 3 gives a schematic representation of the electronic device of FIG. 1 according to a second embodiment improved by this invention. In this figure several oscillators 11 can be linked to the same measuring device 12, in order to share a measuring device 12 among several components 11, or even among all the components 11. At the output of the central unit 15, it would be also possible to simply have a restricted number of comparators 17, even one comparator, to treat several pairs of measured values. Moreover and as represented by the dashed line with reference number 15', the comparator(s) 17 could be integrated in the central unit 15, for example in the form of logic functions. In this case, the unique value 19 would directly derive from the central unit 15'.

It will also be noted that to each component 11 is associated an identifier, namely $ID_1, ID_2, \ldots ID_n$, which allows to designate each component 11 among the group of components 11 that the electronic device 10 includes. Finally, according to this embodiment, the PUF function can be set by a target datum 14, which, as shown in FIG. 3, will be preferably introduced as a parameter in the central unit 15, for example via a dedicated interface. This target datum 14 aims to personalize the electronic device 10, in particular the PUF function that is controlled by the central unit 15, during a preliminary setup operation of the electronic device. Such an operation will be typically carried out initially at the moment of the personalization of the device 10 by a manager or an administrator, which intervenes for this purpose before the use of this device by a final user in the normal operating mode for which it is firstly intended. This personalization allows to select which components 11 on which the physical measurements $f_1, f_2, \ldots f_n$ should be carried out, and to determine how to group the latter, i.e. by pairs, by triplets or more generally by n-tuples, so that from each n-tuple an elementary value is deduced, in response to a comparison carried out between the measured values included therein.

Advantageously, the target datum thus allows to choose the components 11 which must be taken into account by the PUF function in order to generate the unique value 19 or to select measured values f1, f2, ... fn according to components 11 from which these values arise. Therefore, only a part of the assembly components 11 that the electronic device 10 includes can be taken in consideration by this function. Moreover, this target value 14 also allows to determine and to choose how to combine the values measured by the devices 12 so that the pairs 16a, 16b are formed (taken here as an example of n-tuples), each introduced into a comparator 17. Finally, it should be noted that the target datum 14 could also define which number of measured values must be taken into account during each comparison carried out by a comparator 17. Thus, such comparisons are no longer limited to data pairs, i.e. data taken two by two, but could also consider groups of three or four measurements, or even more, forming respectively triplets, quadruplets, or more generally n-tuples. The formation of these n-tuples is described hereinafter with reference to FIG. 4.

Figure 4:
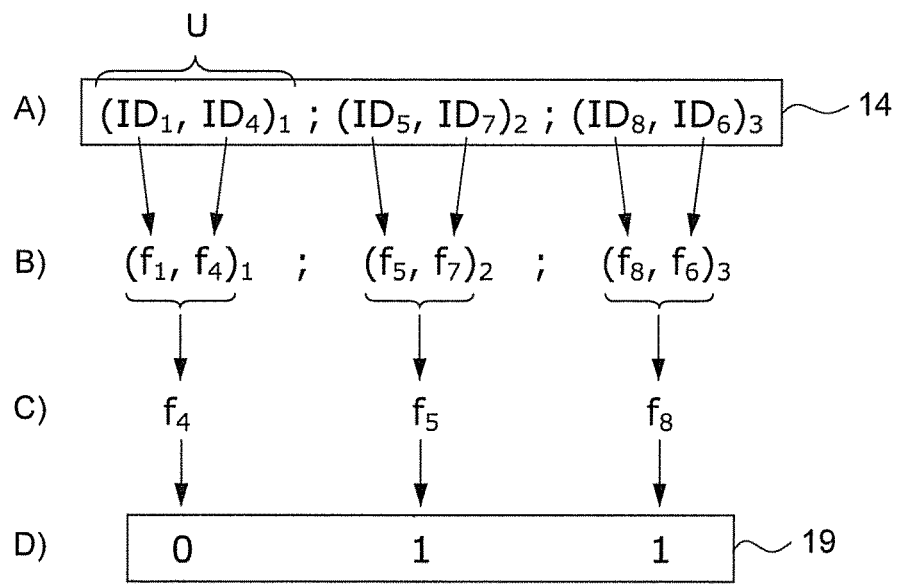
FIG. 4 is a representation of four successive steps A) to D) carried out according to a third embodiment of the process performed by means of the electronic device disclosed in FIG. 3.

FIG. 4 is a representation of four successive steps, with reference A to D, which are carried out according to a preferred embodiment of the process performed by the electronic device of FIG. 3. With reference to the first step A, an example of contents included in the target datum 14 is shown more explicitly. It is noted that the latter includes a collection of n-tuples referenced by U, that the latter are indexed, and each contain a plurality of ordered identifiers $ID_1, \ldots ID_n$. With reference, for instance, to the first n-tuple $(ID_1, ID_4)_1$, it will be noted that the order of the identifiers has a certain importance, because a pair written $(ID_4, ID_1)$ will produce an response inverse to that derived from the pair $(ID_1, ID_4)$. On the other hand, if the n-tuples are indexed by means of an index number, such as number 2 in the pair $(ID_5, ID_7)_2$, it is of little consequence that these n-tuples are ordered among each other. However, if the n-tuples do not expressly include an index number, the index by default associated to each n-tuple of the target datum will be that of its position in the collection with respect to the other n-tuples. Furthermore, and as shown in this FIG. 4, one will note that the identifiers of the components of the electronic device 10 are not necessarily all considered, but that at least a part of these identifiers is taken into account and is present in the target datum 14. Thus, although the electronic device 10 can integrate a large number of oscillators 11, it is however not necessary for all these oscillators to be taken into account in order to obtain, in response of the PUF function, a unique value at the output of the device 10. Finally, although pairs of identifiers form the n-tuples U in this figure, it will be noted that any n-tuple of the target datum could comprise more identifiers.

Steps A to D of FIG. 4 schematically illustrate how the unique value 19 is obtained from the target datum 14. The first step A consists in reading this target datum. This reading allows to recognize the n-tuples U, to know their number as well as the index associated to each of them. Furthermore, this reading allows repeating the previous mentioned operation for the identifiers comprised in each n-tuple.

The second step B aims firstly to carry out or to obtain, for each identifier of each n-tuple U, a measurement of a physical quantity of said component 11 to which this identifier is associated. Then, this step aims to form, in connecting with the first n-tuple collection, a second collection of indexed n-tuples (preferably by the same indexes as those of the first collection), containing the measurements thus carried out. As an example with the first n-tuple of the target value 14, one will form in connecting with an n-tuple that will carry the same index, i.e. the number 1, and that will contain, first of all, the measured value f1, a measurement carried out by a measuring device 12 on the component 11 to which the identifier $ID_1$ is associated, and secondly, the measured value f4, a measurement carried out by a measuring device 12 on the component 11 to which the identifier $ID_4$ is associated.

The third step C refers only to the n-tuples of the second collection and consists, for each n-tuple of this second collection, of identifying which physical measurement is the most extreme and to associate to this n-tuple an elementary value (typically a bit) according to the order of the extreme value in this n-tuple. This order refers to the order in which the measured values are positioned in the n-tuple. In the example disclosed in FIG. 4, one will search for example to determine as an extreme value the highest value among all the measured values that are part of a same n-tuple. According to this condition, it results for example that the highest value between the measurements $f_1$ and $f_4$ of the index n-tuple 1 is $f_4$. For the second and third n-tuple of this example, the extreme values are respectively $f_5$ and $f_8$. Of course, the weakest value could also be considered as the determining extreme value. Once the extreme value within an n-tuple has been identified, this elementary value is associated to a n-tuple, in this case a bit 1 or 0 according to the position occupied by this extreme value in this n-tuple. Still according to the example of FIG. 4, it has been chosen to consider that if the most extreme value is placed in first position inside of the n-tuple, the elementary value associated to this n-tuple will be of a 1 and in the other case of a 0. Thus, as the most extreme values are f4, f5, and f8 for the n-tuples of respectively the first, second and third index, and as only the value f4 is located in second position in its n-tuple, the elementary values associated to these three n-tuples are respectively 0, 1, and 1.

The fourth step D consists in combining (for example concatenating) successively said elementary values, according to the index of the n-tuples to which these elementary values are associated, in order to obtain, at the end, the unique value 19. In the example of FIG. 4, the unique value 19, which results from the elementary values ordered according to the index of the associated n-tuples, is the binary value 011 having three bits. If each elementary value is a value of one bit (which, however, is not an obligation), the number of bit N that will constitute the unique value 19 will correspond to the number of responses obtained at the output of the comparator(s) 17 at the end of the process performed in the central unit 15.

From a conceptual point of view and if the electronic device 10 includes a number of comparators 17 equal or higher than the number of elementary values that the unique value 19 may comprise, the scheduling of the n-tuples contained in the target datum 14 will be respected by the central unit 15 at its outputs 16, so that for instance, the first n-tuple (index n-tuple 1) of the second collection will be directed towards the first outputs 16a, 16b leading to the first comparator 17, the second n-tuple (index n-tuple 2) of this same collection will be directed towards the second outputs 16e. 16b leading to the second comparator, and so on for all the second collection n-tuples. As an alternative and particularly if the electronic device 10 includes less comparators 17 than those mentioned above, the central unit 15 will ensure to deliver the n-tuples, at its outputs 16, successively in the order of their index so that they can be treated in the same order by the comparator(s) 17 in order to obtain a unique value 19 formed by an ordered succession of elementary values.

As mentioned above with reference to the initial personalization operation, the choice of the first collection n-tuples that identify the oscillators 11 can be done upstream of a normal use mode, typically during a setup mode during which the target datum 14 will be defined. During this setup mode, the administrator or the manager of the target datum will have the possibility to read all the measurements values carried out on oscillators 11 by one or several measuring devices 12. Advantageously, this invention allows in this setup phase to select which are the identifiers of the oscillators that should be grouped by n-tuples, in order to be able to guarantee a response as constant as possible during the consideration of the corresponding n-tuples in the second collection.

The choice of the identifiers of the oscillators 11 in each n-tuple is an empiric choice that essentially depends on statistics. The latter will allow identifying the n-tuples from which a satisfactory difference appears at the level of frequencies in order to be able to tolerate a residual noise as much as possible. Such a difference can be shown during the setup mode, as this mode authorizes the reading of all the values of measurements carried out on the unit of the oscillators 11. The access to this setup mode is preferably protected. Thus, to be able to enter this mode, the administrator, for instance, must sign a particular message or enter a password. As an alternative, it could be also possible to block the access to the setup mode definitively as soon as the administrator leaves it after his first access. In such a case, the setup mode would be accessible only once, which increases the protection of the electronic device 10.

Figure 5:
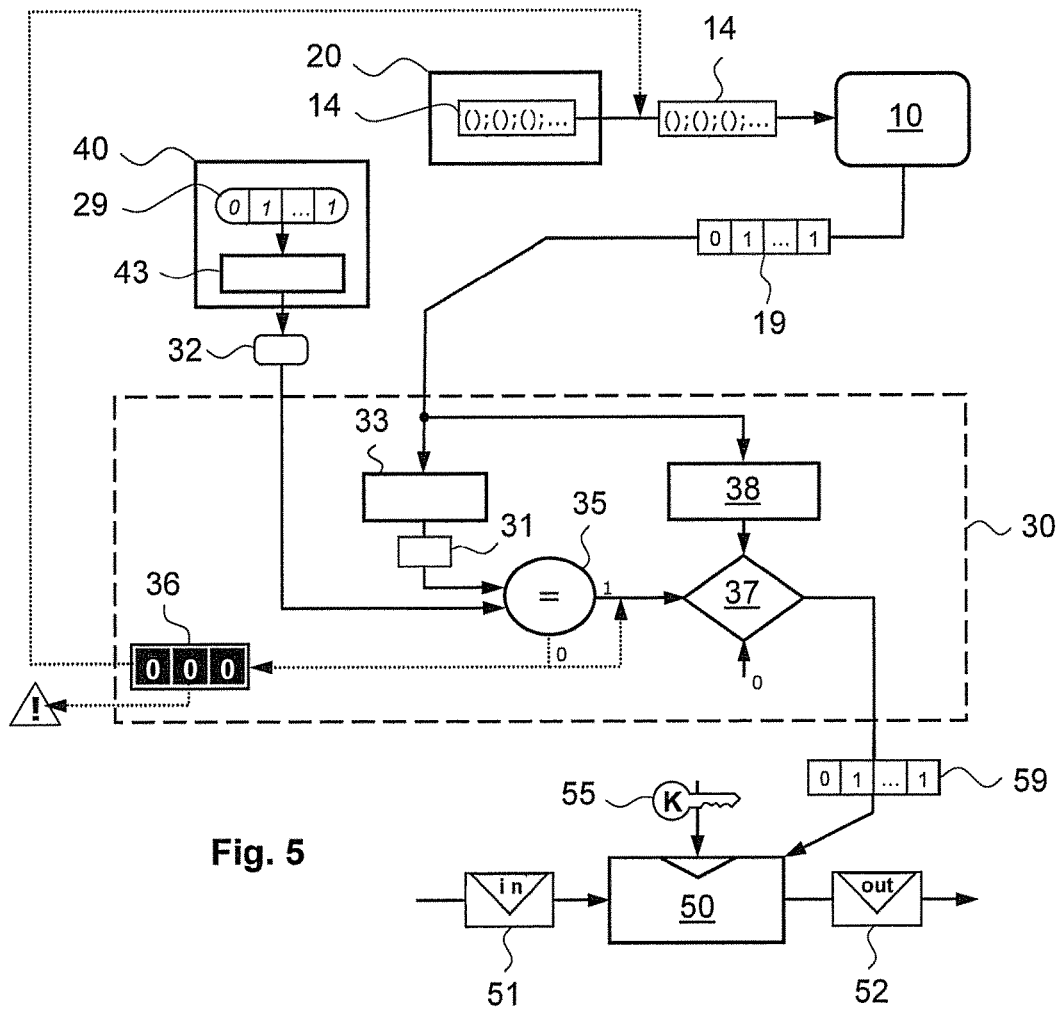
FIG. 5 is a schematic representation of a fourth embodiment of the process of this invention.

FIG. 5 shows another embodiment which is more complex than that of FIG. 2 and which, like that of the last figure, refers to the normal use accessible to the final user, as opposed to the setup mode which is reserved to the electronic devices 10 administrator or manager.

In this FIG. 5, one recognizes the elements illustrated in FIG. 2 to which, on the one hand, a first data source 20 has been added, located preferably in the user environment, and on the other hand a second data source 40 located in an environment outside that of the user. Such an external environment can be that of a service supplier, such as a provider broadcasting entry data 51 to be decrypted. The first source 20 supplies the target value 14 to the electronic device 10. The second source 40 contains an expected reference value 29.

The expected reference value 29 is the value to which the unique value 19 must usually correspond. This reference value 29 is thus the most probable value that will be received from the electronic device 10 in normal conditions of use. The expected reference value 29 is preferably determined beforehand in stable conditions. These latter can be defined by the manufacturer and are those that ensure to find as many times as possible the same unique value 19 during successive reiterations of the PUF function in the electronic device 10. The expected reference value 29 is thus that which, in normal conditions, will be obtained in almost all of the iterations. Thanks to the target datum 14 which allows the administrator to judiciously choose the identifiers of the components 11 of each n-tuple, it is possible to improve the stability of the unique value 19 outputting from the electronic device 10 and thus to increase the range of the normal conditions of use that this device is able to tolerate. However, we cannot exclude the formation of a unique value 19 different from the one usually expected at the output of the electronic device 10. This case can indeed occur by simply toggling one elementary binary value to the other, typically when a bit 18 jumps from value 0 to value 1 or conversely, for instance, after a short excess of noise.

In a schematic way, the first data source 20 thus integrates the target value 14 (or the data which allows to determine the latter) that has been defined during the setup mode of the electronic device 10 and which will be used in normal use by the final user. More concretely, the first data source 20 can consist in a storing device, or an external distribution device, from which the electronic device 10 will read or obtain the target value 14. The storing device can be connected to the electronic device 10 or be directly housed in the latter. In the latter case, the storing device can be a flash memory or a protected access memory, or even a memory monolithically associated to an electronic chip, for example to the electronic device 10. The choice among these different types of memory can depend on the data stored therein, in particular on their confidential or non-confidential nature. Typically, the target value 14 could correspond to confidential data, in particular if said value is not blurred, encoded or both, but memorized as such. Finally, the distribution device can be a data supplier to which the storing device and/or the electronic device 10 can be connected by a wire or wireless connection of any type (mobile telephone network, Wi-Fi, Bluetooth, NFC, etc . . . ). This data supplier can be the same as the service supplier mentioned before.

Always with reference to the illustration given by FIG. 5, it is noted that the electronic device 10 produces the unique value 19 as explained with reference to the previous figures. This unique value is introduced into the intermediate module 30 that is in charge of issuing the complementary value 59. This intermediate module 30 includes at least one comparison device 35, which can be preceded by a transformation device 33. Optionally, the intermediate device 30 can particularly further include an iteration counter 36. As represented in FIG. 5, the unique value 19 is introduced in the transformation device 33. By means of a function and on the base of this entry value, the transformation device produces a first data 31. The first data 31 results at least from the unique value 19, i.e. is derived from or at least is dependent on this value 19. The second data source 40 produces a second data 32 based on the same principle, i.e. on the base of the expected reference value 29 and of a second transformation device 43 that produces the same transformation as that carried out by the first transformation device 33. The second data 32 is used as a reference data in order to control the first data 31.

The function applied in the transformation devices 33, 43 only produces a transformation of the entry value(s) (i.e. at least the value 19, respectively 29). Beside the second data source 40, this transformation has the purpose to secure the expected reference value 29 so that the latter remains secret and is not transmitted as such between the supplier's environment and the user's environment. This transformation also aims to guarantee the integrity of the expected reference value 29. In a preferred embodiment, it is possible to proceed in the same way between the electronic device 10 and the intermediate module 30 in order to avoid transmitting the unique value 19 as such between both these devices. This could be obtained by displacing the first transformation device 33 into the electronic device 10, so that the latter supplies the first data 31 at its output (instead of supplying the unique value 19). This first data 31 would then be conveyed, just like the second data 32, towards the intermediate module 30, in particular towards the comparison device 35 of this module.

By means of the comparison device 35, the intermediate module 30 determines if the first datum 31 is identical to the second data 32. This test allows controlling the unique value 19 produced by the electronic device 10. If the comparison shows that the first data differs from the second, then, either the target datum 14 used by the electronic device 10 during the normal use differs from that defined for this device during the setup mode, or the process implementing the PUF function within the electronic device 10 has suffered from a punctual noise having led for example to invert at least one bit 18 and therefore to produce an erroneous unique value 19. In the first case, the electronic device 10 might not be the original electronic device or, more simply, might not be the right electronic device to which the expected reference value 29 in question is associated. In the second case, the process could be configured so that a new unique value 19 can be generated in an iterative way (shown in dashed lines in FIG. 2), preferably by an iteration counter 36. Thus, a limited number of reiterations resulting from a comparison producing a negative outcome at the output of the comparison device 35 could be provided before the process blocks, generates an alert message, definitively releases a negative response, or undertakes another particular action (action shown in FIG. 5 by a triangle with an exclamation mark).

According to the negative or positive result, emitted by the comparison device 35, the intermediate module 30 will supply a complementary value 59 which can respectively either correspond to the unique value 19 or to a derived value, or include a different value comparable to an erroneous response, for instance a default value such as zero. In the first alternative, the algorithm 50 will be able to carry out a cryptographic operation producing as a response a correct output data 52 (provided that the key 55 is also correct), while in the second alternative this output data 52 can only be incorrect.

The generation of the complementary value 59 from the information transmitted by the comparison device 35 can be realized in various ways. One of them consists in transmitting the positive or negative result of the comparison to a selection device 37, for example by transmitting a value bit 1, respectively of value 0. According to the response received from the comparison device 35, the selection device 37 will be able to select if it is appropriate to deliver to the algorithm 50 (via the complementary value 59) a correct value or an erroneous value such as a default value, or even a random value (in so far as the random value is also different from the unique value 19). In order to do this, the selection device 37 can for instance, either release the unique value 19 stored in a record 38 during its introduction in the intermediate module 30, or, in replacement of this unique value, release an erroneous value (corresponding to the default value 0 in FIG. 5).

Figure 6:
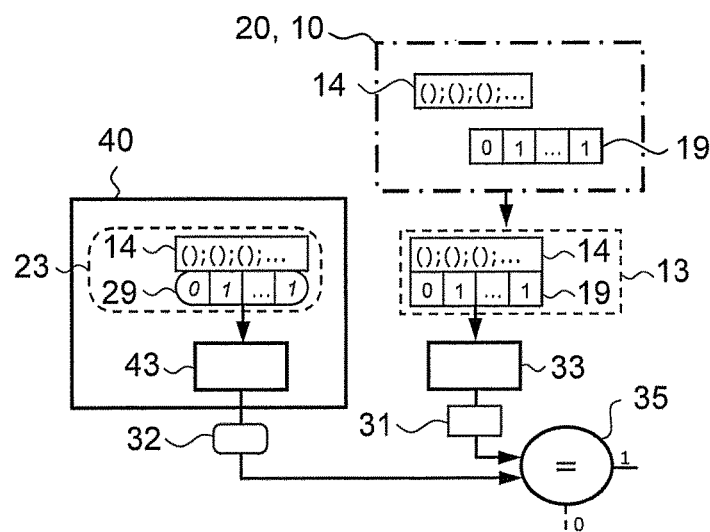
FIG. 6 is a variant of the process shown in FIG. 5, according to a partial representation of the process of the invention.

FIG. 6 shows a variant of the embodiment represented in FIG. 5. According to this variant, each of first data 31 and second data 32 also integrate the target data 14. The function carried out by the transformation devices 33, 43 will thus aim to produce a data 31, 32 based on the combination of the unique value 19 and the target datum 14, respectively of the expected reference value 29 and this target value 14. The concerned combination can for example correspond to a concatenation of these values or to another, more complex combination. This can also be carried out through a function that accepts the value 19, 29 and the target datum 14 as parameters of this function. This combination will be carried out in the same way on both sides, i.e. in the supplier's and in the user's environment. As shown in FIG. 6, the data introduced in entry in each of the transformation devices 33, 43, can consist of a first data set 13, respectively of a second data set 23. The first set 13 will be formed by the unique value 19, derived from the electronic device 10, and by the target datum 14, derived either from the data source 20 or from the electronic device 10. The data from each of these sets can be already combined provided that this combination is carried out in the same way for each set. As an alternative, the first transformation device 33 could also be in the electronic device 10, for the same reasons as those previously mentioned with reference to FIG. 5. In this case, the first data 31 would derive directly from the electronic device 10.

According to a preferred way of execution, the function applied by each of the transformation devices 33, 43 will be a hash function. Thus, the first and second data 31, 32 will correspond each to a digest resulting from the hash function applied respectively to the first and to the second data set 13, 23. Such a hash function is also applicable to the previous embodiment in which only the unique value 19 and the expected reference value 29 are entered into the transformation device 33, 43 respectively. As an alternative to such a hash function, the sensitive data (19, 20, 14) could also be secured by means of another function for example involving a random number. Such a random number would be than shared on both sides by the transformation devices 33, 43 so that each of these transformation devices can reproduce this function with the same random number. Whatever function is used (hash function, function involving a random value or another transformation function), the latter allows guaranteeing not only the confidentiality but also the integrity of the sensitive data to which it is applied.

Thanks to the target datum 14 which allows to select, by a sound choice, which components 11 are the most suitable during the comparison of the corresponding measured values $f_1, f_2, \ldots f_n$, it is possible to significantly increase the reliability of the unique value 19 obtained at the output of the electronic device 10. As a consequence, it becomes also possible to avoid any error correction process (well known from prior art), which, on the other hand, is a necessary step if the response of the chip, which involves the PUF function, is not sufficiently stable and thus lacks reliability. Advantageously, the comparison operation carried out by the device 35, thanks to the reference data 32, contributes to the reliability of the process.

Besides, the target datum 14 could also be used in order to better guarantee the entropy (i.e. the degree of diversity or disorder) of the unique values (PUF) generated by a population of electronic devices 10. Indeed, it could be very useful to be able to ensure that each electronic device 10 of such a population really produces a unique value, in order to exclude that two different electronic devices 10 accidentally produce the same PUF value 19. Although each unique PUF value 19 is defined as being unique since it is intrinsically bound to the material that composes the electronic device 10, the risk that two electronic devices 10 produce the same unique value 19 can for example be inversely proportional to the number of components 11 considered in this device 10. Thanks to the target datum 14, which allows to select the components 11, and in particular the combinations of these components, which can be used to generate each bit 18 of the unique value 19, it also becomes possible to modify the choice of a first selection if one notices that its result (unique value 19) has already been obtained by a previous electronic device 10. Such a control operation of the unique value 19 can be realized by listing, via a recoding in a database, all the unique values 19 generated by the previous electronic devices 10 of the same population. Thus, in the context of a personalization or initial setup of the electronic devices 10, the manager which has the control of the electronic devices 10 could advantageously verify that the unique value 19 deriving from a new electronic device 10 is truly unique and thus reflects a personal character, before this device rejoins the population of electronic devices 10 already existing. Such verification could be achieved rapidly and automatically by comparing the PUF value 19 delivered by a new electronic device 10 with each of the unique values 19 recorded in the database.

Figure 7:
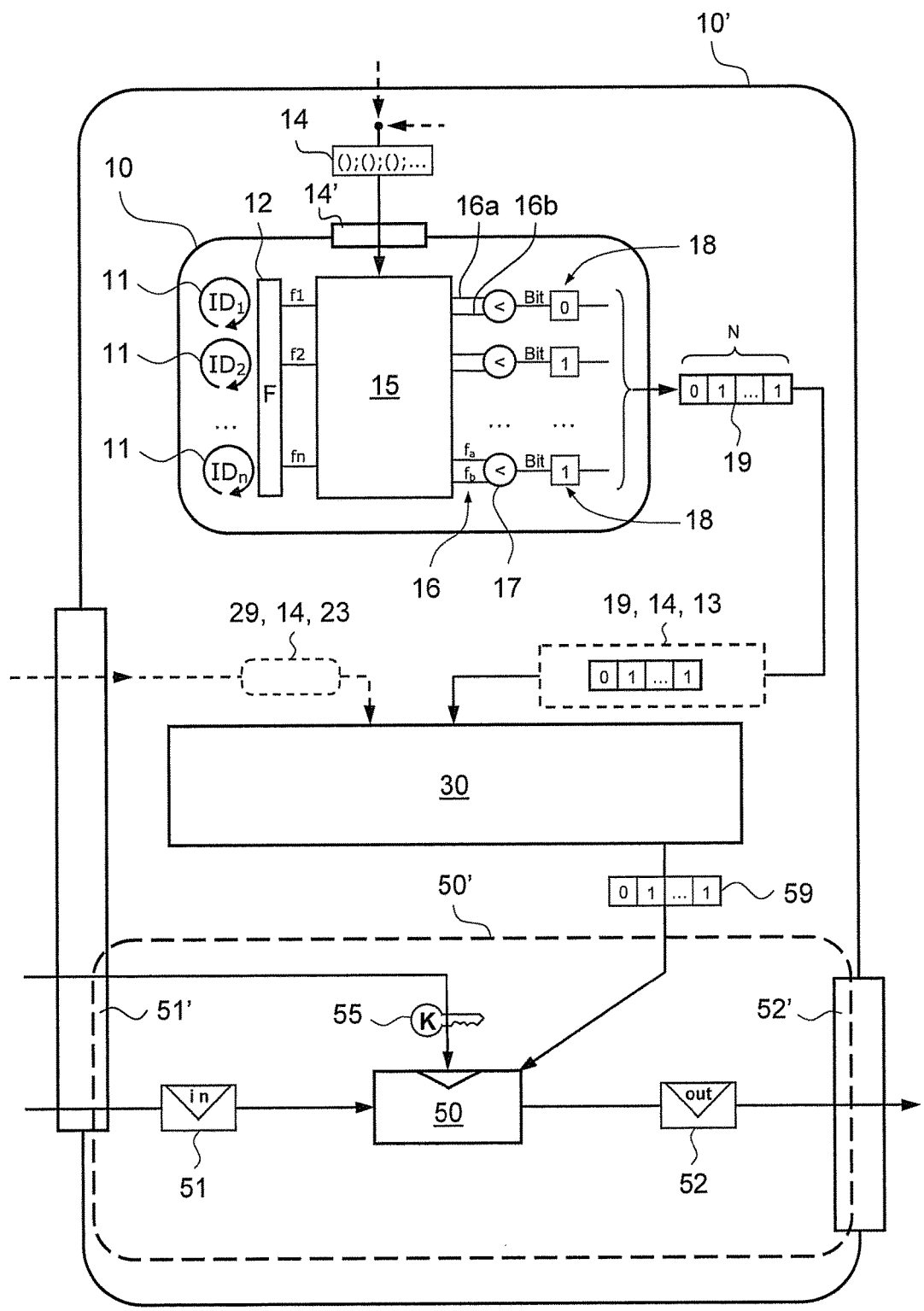
FIG. 7 gives a schematic representation of an embodiment of the cryptographic device corresponding to the second object of the present invention.

The present invention also concerns a cryptographic device for the implementation of the process according to any of the variants previously described. As shown schematically in FIG. 7, this device includes:

- a cryptographic unit 50' for implementing a cryptographic algorithm 50 from an input message 51, a cryptographic key 55, and a complementary value 59 used as a parameter of the algorithm 50,
- an electronic device 10 with a plurality of components 11 on each of which at least one physical quantity can be measured by a measuring device 12 to obtain a measured value $f_1, f_2, f_n$, which is then transmitted to a central unit 15 (via a connection linking the latter to the measuring device 12) in view to generate a unique value 19 by using a PUF function inherent to the electronic device 10, and
- an intermediate module 30 for setting-up the complementary value 59 according to the unique value 19.

According to the embodiment of the electronic device 10, the central unit 15 can integrate the comparator(s) 17 (which can be realized in the form of logic functions) so that the unique value 19, based on the measured values and on the PUF function, can directly be output from the central unit 15. Still preferably, the electronic device 10 can be made in a monolithic form so that all the elements that compose it are joined in a single block. Advantageously, such an embodiment offers an efficient protection against any hacking attempt of the electronic device 10.

Such a device could be a cryptographic module such as the module 10'. The cryptographic unit 50' allowing to implement the algorithm 50 is provided with at least one input interface 51' and one output interface 52'.

Preferably, the electronic device 10 (for example its central unit 15) can also be set by the target datum 14 to allow selection of the components 11 on which the physical measurements $f_1, f_2, \ldots f_n$ will be carried out for determining the unique value 19 via the PUF function.

As an alternative, the electronic device 10 could furthermore involve a communication interface 14' dedicated to the input of the target datum 14 into the central unit 15 in order to allow, if any, a reconfiguration of the electronic device 10. If necessary, this interface 14' could also be linked to the input interface 51' of the cryptographic module 10'. Besides, the electronic device 10 can be removable and/or separated from the cryptographic device 10', in particular from the rest of this device.

If the electronic device 10 is separated, even temporarily, from the cryptographic device 10', the latter could comprise instead of the electronic device 10 a communication interface in order to obtain from this electronic device 10 the unique value 19 which is physically bound to it. This interface could be the input interface 51' of the cryptographic device 10' or a specific interface. According to another embodiment, such a specific interface could also be used so that the target datum 14, intended for the electronic device 10, can be received through the cryptographic device 10'.

Still preferably and as already mentioned, the components 11 of the device 10 are oscillators. However, other components could well be used for carrying out measurements other than frequency measurements. Besides, the components 11 do not necessarily have to be all of the same type and the measuring devices 12 could also be able to measure different physical quantities.

This invention also intends to cover the single electronic device 10 shown in FIG. 3, i.e. a device allowing at least generating a unique value 19 by using a physically unclonable function inherent to this device, and comprising:
- a plurality of components 11 on each of which at least one physical quantity can be measured,
- at least one measuring device 12 for obtaining a plurality of measured values $f_1, f_2, f_n$, each specific to one component 11,
- a communication interface 14' to receive a target datum 14 suitable for setting the physically unclonable function by selecting the measured values that have to be processed therein, and
- a central unit 15 to generate, using said physically unclonable function, said unique value 19 from said selected measured values $f_1, f_2, f_n$.

As shown in the present description, such an electronic device 10 can find an application in a process or a unique cryptographic device with physically unclonable function.

As explained with reference to FIG. 4, an identifier can be associated to each of the components 11 of the electronic device 10. By integrating an indication related to these identifiers into the target datum 14, this target datum allows, in a preferred embodiment, to select the components 11 on which the physical measurements $f_1, f_2, f_n$, are carried out. As an alternative, the target datum 14 could be used for selecting a set or a subset of measurements among the physical measurements $f_1, f_2, f_n$, carried out on all or part of the components 11.

Preferably, the target datum 14 includes a collection of n-tuples each including a plurality of ordered identifiers selected among the identifiers previously associated to the components 11. The n-tuples of this collection can be indexed or simply ordered within the collection, i.e. be arranged in a particular order relative to each other.

According to one embodiment, the electronic device 10 could be a security module or an electronic card of such a module, for example within a decoder (set-top-box) for digital pay television. As an alternative, the electronic device 10 could be directly housed in such a decoder.

The invention claimed is:

1. A cryptographic method for encrypting or decrypting an input message by an electronic device, the method comprising
    determining a complementary value on the basis of a unique value physically bound to the electronic device by a physically unclonable function which is inherent to the electronic device and which is used for generating the unique value from a plurality of physical measurements carried out on components integrated in said device; and
    encrypting or decrypting the input message using the input message, a cryptographic key and the complementary value as separate inputs to a cryptographic algorithm, wherein the cryptographic key is not affected by the complementary value.

2. The method according to claim 1, wherein the physical measurements are selected as a function of a target datum.

3. The method according to claim 1, wherein the components on which the physical measurement are carried are selected as a function of the target datum.

4. The method according to claim 3, wherein said target datum provides a collection of indexed n-tuples each containing a plurality of ordered identifiers selected from among identifiers associated with the components, and wherein said unique value is determined by the steps of:
    reading the target datum;
    obtaining for each identifier of each n-tuple a measurement of a physical quantity of said component to which this identifier is associated, and in correspondence, forming respectively a second collection of indexed n-tuples containing the values thus measured;
    identifying, for each n-tuple of the second collection, the measured value which is the highest or lowest measured value, and associating to said n-tuple of the second collection an elementary value according to the position of the highest or lowest measured value within said n-tuple; and
    combining successively said elementary values according to the index of the n-tuples to which these elementary values are associated, in order to obtain said unique value.

5. The method according to claim 3, wherein said electronic device acquires said target datum either directly by reading a source inside the electronic device or indirectly by means of a communication interface connecting the electronic device to an external source.

6. The method according to claim 4, wherein said physical quantity is a frequency.

7. The method according to claim 1, wherein said complementary value corresponds to said unique value.

8. The method according to claim 1, wherein said complementary value depends on the result of a comparison carried out between a first data, deriving from said unique value, and a second data used as reference data to control said first data.

9. The method according to claim 8, wherein said first data is derived from said unique value, and wherein said second data is derived from an expected reference value defined as being the value that produces said physically unclonable function during said setup operation.

10. The method according to claim 9, wherein each of said first and second data is furthermore derived from said target datum taken in combination with respectively said unique value and said expected reference value.

11. The method according to claim 8, wherein said first and second data each correspond to the result of a function applied respectively to said unique value and to said expected reference value.

12. The method according to claim 8, wherein said first data corresponds to the result of a function applied to said unique value and to the target datum, wherein said second data corresponds to the result of the same function applied to said expected reference value and to this target datum.

13. The method according to claim 8, wherein said second data of reference is obtained through a communication interface providing an access to an external source.

14. A cryptographic device for performing a cryptographic algorithm to encrypt or decrypt an input message, the cryptographic device comprising:
   a cryptographic unit for implementing the cryptographic algorithm to encrypt or decrypt the input message, the cryptographic algorithm using the input message, a cryptographic key and a complementary value as separate inputs to said cryptographic algorithm, wherein the cryptographic key is not affected by the complementary value; and
   an electronic device integrating a plurality of components, and at least one measuring device configured to obtain a measured value of at least one physical quantity for at least some of the plurality of components; and
   a central unit configured to generate a unique value using a physically unclonable function inherent to said electronic device based at least in part on the measured value of the at least one physical quantity for at least some of the plurality of components;
   wherein the complementary value is based on the unique value.

15. The cryptographic device according to claim 14, wherein the plurality of components, or the physical quantity to be measured for each of the plurality of components, is selected as a function of a target datum.

16. The cryptographic device according to claim 14, wherein said electronic device is removable and/or separated from the cryptographic device.

* * * * *